United States Patent [19]

Karweil et al.

[11] 4,240,927
[45] Dec. 23, 1980

[54] REACTOR FOR THE CONTINUOUS THERMAL TREATMENT OF SOLIDS, PARTICULARLY CARBONACEOUS ADSORBENTS AND PROCESS OF OPERATING THE SAME

[75] Inventors: Joachim Karweil, Essen; Josef Degel, Hattingen; Dietrich Rolke, Frankfurt, all of Fed. Rep. of Germany

[73] Assignee: Bergwerksverband GmbH, Essen, Fed. Rep. of Germany

[21] Appl. No.: 943,751

[22] Filed: Sep. 19, 1978

[30] Foreign Application Priority Data

Mar. 28, 1978 [DE] Fed. Rep. of Germany ....... 2813227

[51] Int. Cl.³ .................. B01J 20/34; B01D 53/08; C02F 1/28; C01B 31/10
[52] U.S. Cl. .................. 252/411 R; 34/10; 34/57 A; 201/31; 201/34; 202/121; 252/420; 422/142; 422/144; 422/145; 432/15; 432/58
[58] Field of Search .............. 252/417, 411 R, 419, 252/420; 34/57 A, 57 R, 57 E; 422/142, 144, 145; 432/15, 58; 201/31-34, 37, 38, 44; 202/120, 121; 210/39, 40

[56] References Cited

U.S. PATENT DOCUMENTS

| 1,551,956 | 9/1925 | Hubmann | 201/34 |
|---|---|---|---|
| 2,851,428 | 9/1958 | Wayne et al. | 252/417 |
| 3,043,752 | 7/1962 | Foch | 201/44 |
| 4,010,002 | 3/1977 | Degel et al. | 252/417 |
| 4,017,422 | 4/1977 | Gappa et al. | 252/417 |
| 4,058,374 | 11/1977 | Jungten et al. | 252/417 |
| 4,115,070 | 9/1978 | Jukkola et al. | 34/57 A |
| 4,131,565 | 12/1978 | Komori et al. | 252/417 |

FOREIGN PATENT DOCUMENTS

1006043  9/1965  United Kingdom .............. 201/31

*Primary Examiner*—P. E. Konopka
*Attorney, Agent, or Firm*—Michael J. Striker

[57] ABSTRACT

A reactor for the continuous thermal treatment of solids, particularly carbonaceous adsorbents comprises two superimposed fluidizing beds, below them a combustion chamber for receiving a fuel- or oil-air mixture, an intermediate regeneration space between the fluidizing beds and a similar space above the upper fluidizing bed. A gas outlet is provided in the top regeneration space to which also the inlet for the material to be treated leads. The outlet for the treated materials is provided on the intermediate regeneration space. The two spaces are connected by a channel through which the overrun of treated material passes from the upper to the intermediate regeneration space. This channel leads from the upper space through the wall of the reactor to the outside and reverts then through the wall back into the intermediate space. Valve means are provided for regulating the flow in the connecting channel.

The reactor is operated by passing a propelling gas from the combustion chamber through the apertured bottoms of the fluidizing beds. The propelling gas may have an excess of 10 to 30% of fuel gas relative to the air and additional air inlets may be provided in the intermediate space as well as an auxiliary burner so as to burn away impurities adhering to the treated material.

5 Claims, 2 Drawing Figures

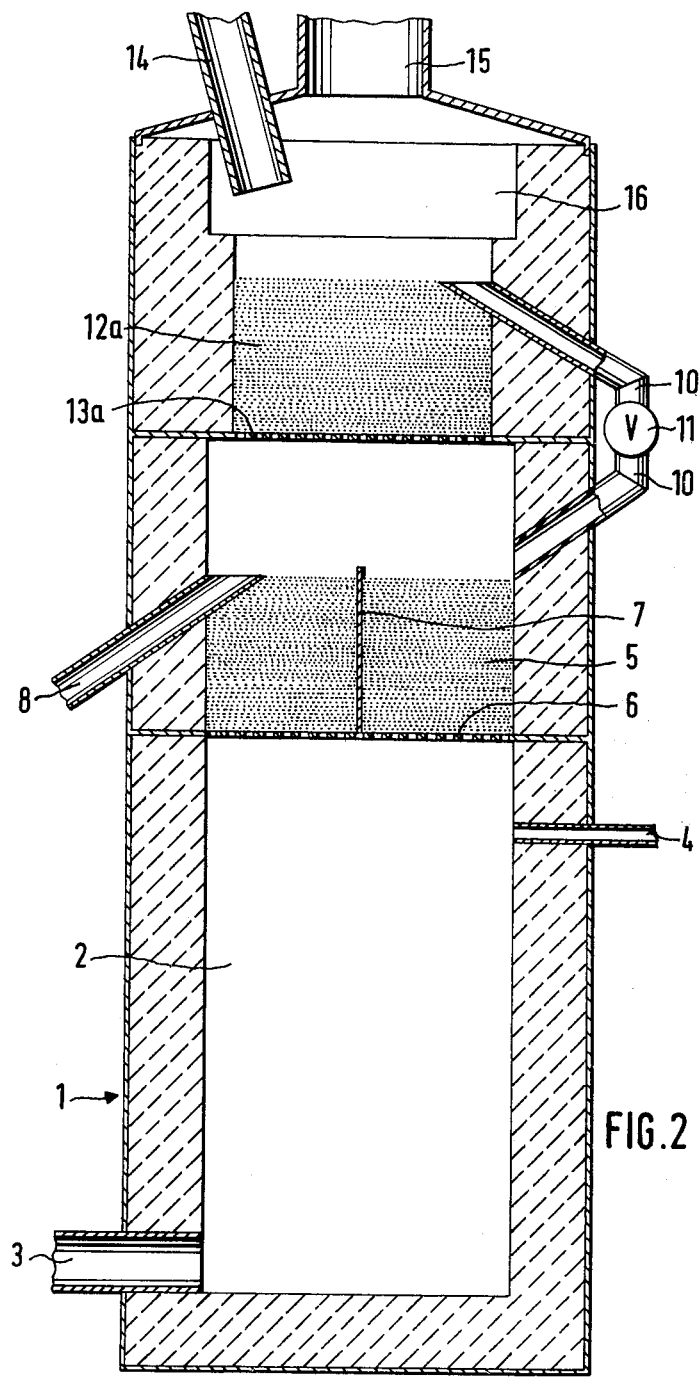

REACTOR FOR THE CONTINUOUS THERMAL TREATMENT OF SOLIDS, PARTICULARLY CARBONACEOUS ADSORBENTS AND PROCESS OF OPERATING THE SAME

BACKGROUND OF THE INVENTION

It is known to reactivate carbonaceous adsorbents in a two-stage fluidizing reactor which comprises a round reactor vessel with two superimposed apertured inlet bottoms. Below the lower inlet bottom there is provided a combustion chamber in which, through combustion of gas or oil, a propelling gas is generated which rises upwards through the apertured bottoms of the fluidizing beds. The gas causes a fluidizing action on the materials disposed on the inlet bottoms while expelling the adsorbed matter. The gas then is discharged from the upper space above the upper fluidizing bed.

Experience has shown that the two fluidizing beds show substantial differences in temperatures in case a wet contaminated activated carbon is charged into the reactor. In the upper fluidizing bed a drying process takes place together with an elimination of the easily desorbed materials at temperatures above about 150° C. The lower fluidizing bed serves more for the reactivation proper which takes place at temperatures above 600° C. and in case of certain contaminations even above 800° C. Thus, a complete regeneration of the carbon is obtained.

Baffle plates are provided on the inlet bottoms or in the fluidizing beds in a direction across to the flow of the material in order to permit the material to flow in a uniform manner and with a constant residence time of each individual activated carbon grain from the upper fluidizing bed to the lower fluidizing bed. For this purpose the discharge of the regenerated activated carbon is also controlled depending on the water contents of the introduced contaminated carbon and the temperature in the area of the discharge space.

After longtime investigations it has been found that interruptions in this process which occur from time to time are caused by the fact that the overflow of the carbon from the upper to the lower fluidizing bed is highly sensitive to the amount of charge in the upper fluidizing bed because of changes in the density of the material or because of clogging up of the apertured bottom of the upper fluidizing bed. The higher the resistance is in the upper fluidizing bed and in its apertured bottom, the more propelling gas will be passed through the overrun tube into the upper fluidizing bed. Since this involves an autocatalytic effect there can occur a complete emptying of the lower fluidizing bed because of excessive spilling of the material into the upper bed which phenomenon results in a complete cessation of the operation.

It was very difficult to recognize this phenomenon since the interior of the reactor is hardly, and the connecting tube is not at all visible during the operation.

It is therefore an object of the invention to avoid these disturbances of continuous operation of the reactor.

SUMMARY OF THE INVENTION

The invention resides in the finding that interruptions of the operation can be avoided and a uniform flow of material throughout the entire reactor can be obtained if the regeneration is effected in a reactor in which the upper fluidizing bed is connected with the lower bed or lower beds by a tubular channel which leads from one to the other bed or beds outside of the reactor and is connected with control organs for the regulation of the flow of material.

It will be understood that this solution was at first not welcome to the expert because it involves a certain loss of heat. It has, however, been found that in this manner a completely automatic operation without any interferences is possible through weeks and months which could not be obtained with a transfer passage of the material which was located in the interior of the reactor and which would be more advantageous under aspects of heat economy. Such direct channel for the overflow material has been described in the U.S. Pat. No. 4,010,002.

As control organs for the amount of flow of the material in the present invention all devices can be used which permit a gastight seal such as bucket wheel valves, piston valves or oscillating shutter valves.

Disposing the connecting tube between superimposed fluidizing beds towards the outside of the reactor has furthermore the advantage that the baffle plates which affect the residence time of the activated carbon in the reactor can be installed in the center of the fluidizing beds and do not have to be shifted to the side as in the above U.S. patent.

In this connection it has been found that the flow of material in case of regeneration of wet activated carbon form a water purification plant can be adjusted through the valve members of the invention sufficiently to permit operating the lower fluidizing bed with only one or several baffle plates while in the upper fluidizing bed no baffle plate is necessary. In case of reactors operating with three or more superimposed fluidizing beds, baffle plates can be completely dispensed with.

Besides, the material flow can additionally be adjusted by arranging the tubular outlet for the treated material in the lower fluidizing bed additionally in a manner that the outlet level can be adjusted.

It is common knowledge in this art that the density of contaminated activated carbon is higher than the density of partly or completely regenerated activated carbon. It has therefore been proposed to introduce into the free space below the upper fluidizing bed additional propelling gas in order to obtain a sufficient fluidizing action in the upper bed for the introduced activated carbon of higher density.

It has been found, however, that the problem of a higher flow speed for the upper fluidizing bed can also be solved by providing the upper fluidizing bed with a diameter which is smaller by 10 to 30% relative to the lower fluidizing bed.

The transfer of material from the upper fluidizing bed to the lower bed through an exterior connecting tube which is provided with flow regulating devices makes the introduction of additional amounts of propelling gas into the space below the upper fluidizing bed better feasible. The reason is that now a breakthrough of propelling gas through the connecting fluid is practically impossible. The regeneration process therefore is less sensitive to changes in the amount of propelling gas which enters the fluidizing beds.

Surprising it has also been found that when the propelling gas is introduced into the free space below the upper fluidizing bed it is possible under certain conditions to burn off the contaminations in the reactor itself such as are released in the lower fluidizing bed. Thus, a substantial amount of energy in operating the reactor can be saved and the amount of contamination in the discharged propelling gas can be substantially diminished. To accomplish this the temperature in the free space below the upper bed must be high enough to reach the ignition temperature of the contaminations.

Introduction of additional propelling gas into the free space below the upper fluidizing bed permits in general a particularly economical operation of the reactor. The reason is that in the combustion chamber a gas-air mixture or oil-air mixture can be burned which has an excess of gas or oil and the excess gases which have not been burned for this reason can then be subjected to complete combustion after introducing into the free space below the fluidizing bed further air as additional propelling gas. Thus, the contaminants are burned in the reactor itself while substantial amounts of energy are saved.

In general it is preferred to operate the combustion chamber below the lower fluidizing bed with a stoichiometric fuel gas excess of about 10 to 30% and to subject the unburned portion to combustion in the space below the upper fluidizing bed. The saving in energy through burning off of the released contaminants is about 10 to 15%.

For this type of operation it is particularly preferred to provide an auxiliary burner in the reactor at the level of the free space below the upper fluidizing bed which will enable to ignite the released contaminates independent of the otherwise prevailing temperature in the space below the upper bed and to cause a complete combustion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing of FIG. 1 shows the reactor of the invention in a vertical cross section;

FIG. 2 shows a similar cross section of another embodiment in which the upper fluidizing bed has a smaller cross section compared with the lower fluidizing bed.

DESCRIPTION OF OPERATION AND PREFERRED EMBODIMENTS OF THE REACTOR

EXAMPLE 1

Figure 1:
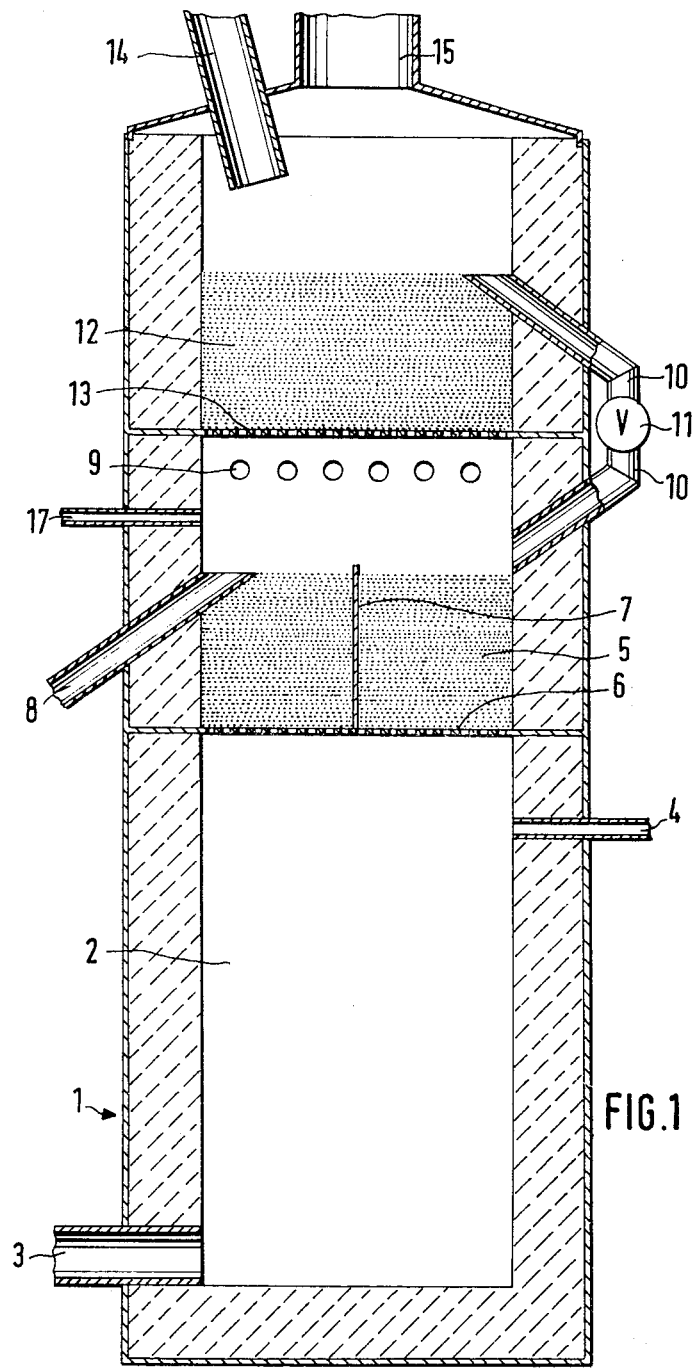

In a two-stage round fluidizing reactor 1 of an inner diameter of the two beds 5, 12 of 800 mm supported as perforate supports 6, 13 as illustrated in FIG. 1, an amount of contaminated activated carbon of 400 kg per hour having a water contents of 50% relative to the wet carbon and a grain size of 1 to 3 mm was introduced at 14. Through combustion of consumer gas admitted at 3 (calorific value 4,000 kcal/m³) with 20% of air below the stoichiometric value and with injection of water at 4 a propelling gas of 900° C. temperature was generated in the combustion chamber 2. Into the space below the upper fluidizing bed air was blown through opening 9 in an amount that the stoichiometric excess of gas, ignited through burner tube 17, was subjected to combustions and the released contaminations were burned off. The temperature of the propelling gas which rises from the lower bed at a temperature of 650° to 700° C. was thus increased to 750° to 800° C.

Carbon was continuously passed through the connecting tube 10 with its valve 11 from the upper fluidizing bed 12 into the lower bed 5 having the baffle 7 therein. Through the discharge channel 8 from the lower bed 190 kg of regenerated activated carbon were withdrawn. Exhaust gases were vented from the reactor at 15. The adsorptive power of this carbon was equal to the same activated carbon which had not yet been used for any adsorption purposes (fresh carbon).

EXAMPLE 2

With reference to FIG. 2 there were introduced into the reactor there illustrated 500 kg per hour of a contaminated activated carbon as otherwise described in Example 1. The two-stage round reactor had a lower fluidizing bed 5 with a free diameter of 900 mm and an upper fluidizing bed 12a of 750 mm supported on perforate support 13a.

By the stoichiometric combustion of natural gas (calorific value 8,000 kcal/m³) and upon injection of water a propelling gas was generated in the combustion space at 800° C. which served to cause a fluidizing action in both fluidizing beds. In the upper bed mainly a drying occurred while in the lower bed the expulsion of the contaminations was effected. Through the discharge tube regenerated activated carbon was withdrawn in an amount of 240 kg per hour. The adsorptive power of the regenerated carbon was again the same as that of fresh carbon.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for the continuous thermal regeneration of carbonaceous adsorbents in a reactor, said process comprising the steps of admitting into a combustion chamber a volume of air and a quantity of fuel which is greater than required to support combustion, so that the combustion of some of the fuel produces a propellant gas; passing the propellant gas and the excess uncombusted fuel entrained therein upwardly in the reactor for successive travel through a lower fluidizing bed, an intermediate substantially vacant regeneration space, thereafter through an upper fluidizing bed and finally through a top regeneration space from which the propellant gas is then discharged; introducing carbonaceous adsorbent material to be regenerated but not to be combusted into said top regeneration space for entry into said upper fluidizing bed; admitting air into said intermediate regeneration space to cause combustion therein of the heretofore uncombusted excess fuel entrained in said propellant gas, so as to burn away contaminants which are present in said adsorbent material; passing the overflow of adsorbent material from the upper regeneration space in a path leading to the outside of the reactor and then reverting back into the reactor and connecting with the intermediate regeneration space, for the material to enter into the lower fluidizing bed; and withdrawing the regenerated uncombusted adsorbent material from the intermediate regeneration space to the exterior of the reactor.

2. The process of claim 1 wherein the fuel is gas or oil and is employed in a stoichiometric excess of 10 to 30% relative to the combustion air.

3. The process of claim 1 wherein the excess fuel in said intermediate regeneration space is ignited or reignited by auxiliary burner means.

4. The process of claim 1 wherein the temperature in the intermediate regeneration space is maintained high enough to ignite the excess fuel.

5. The process of claim 1 wherein water is introduced into the combustion chamber to control the temperature and combustion therein.

* * * * *